United States Patent Office

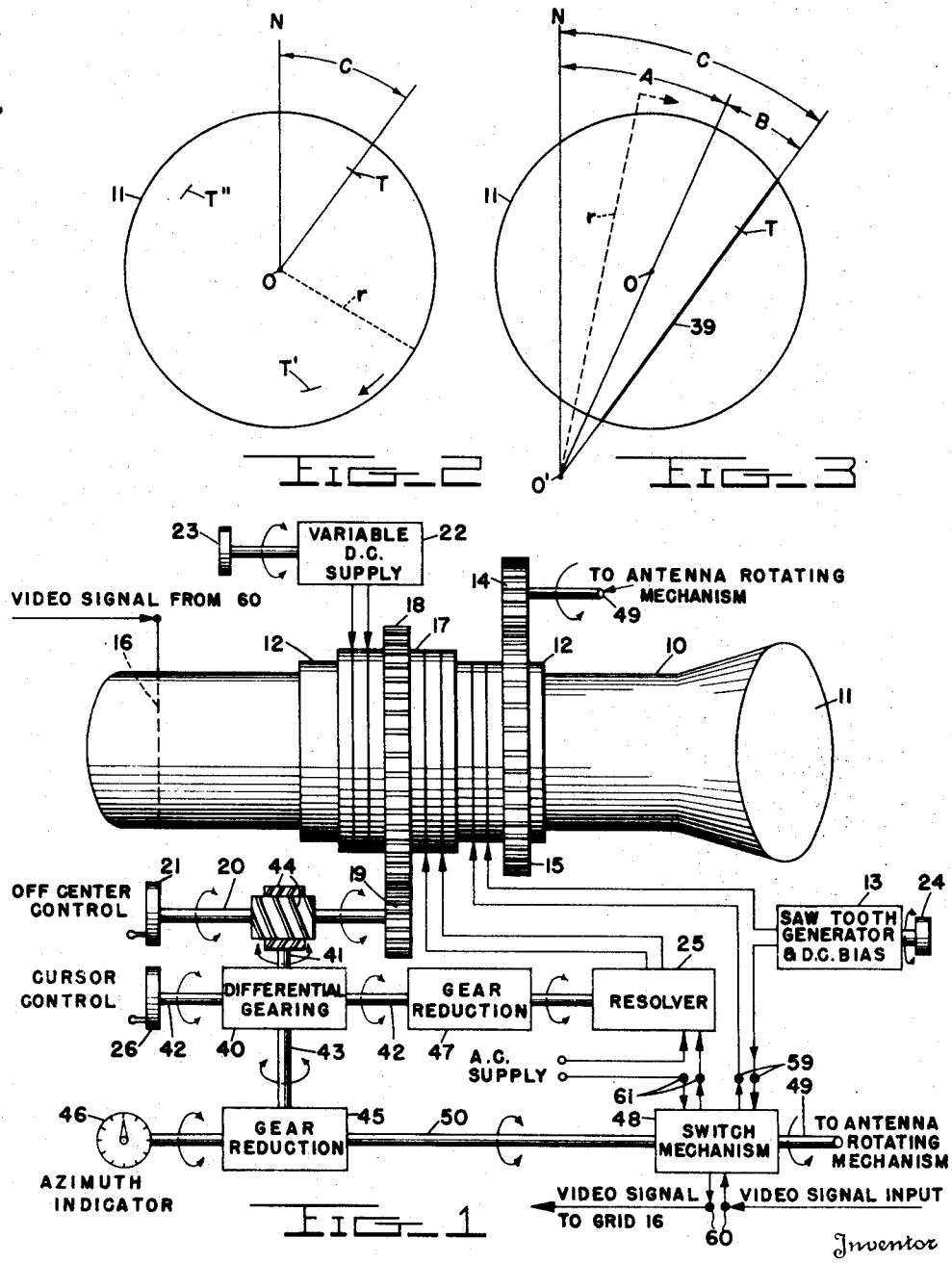

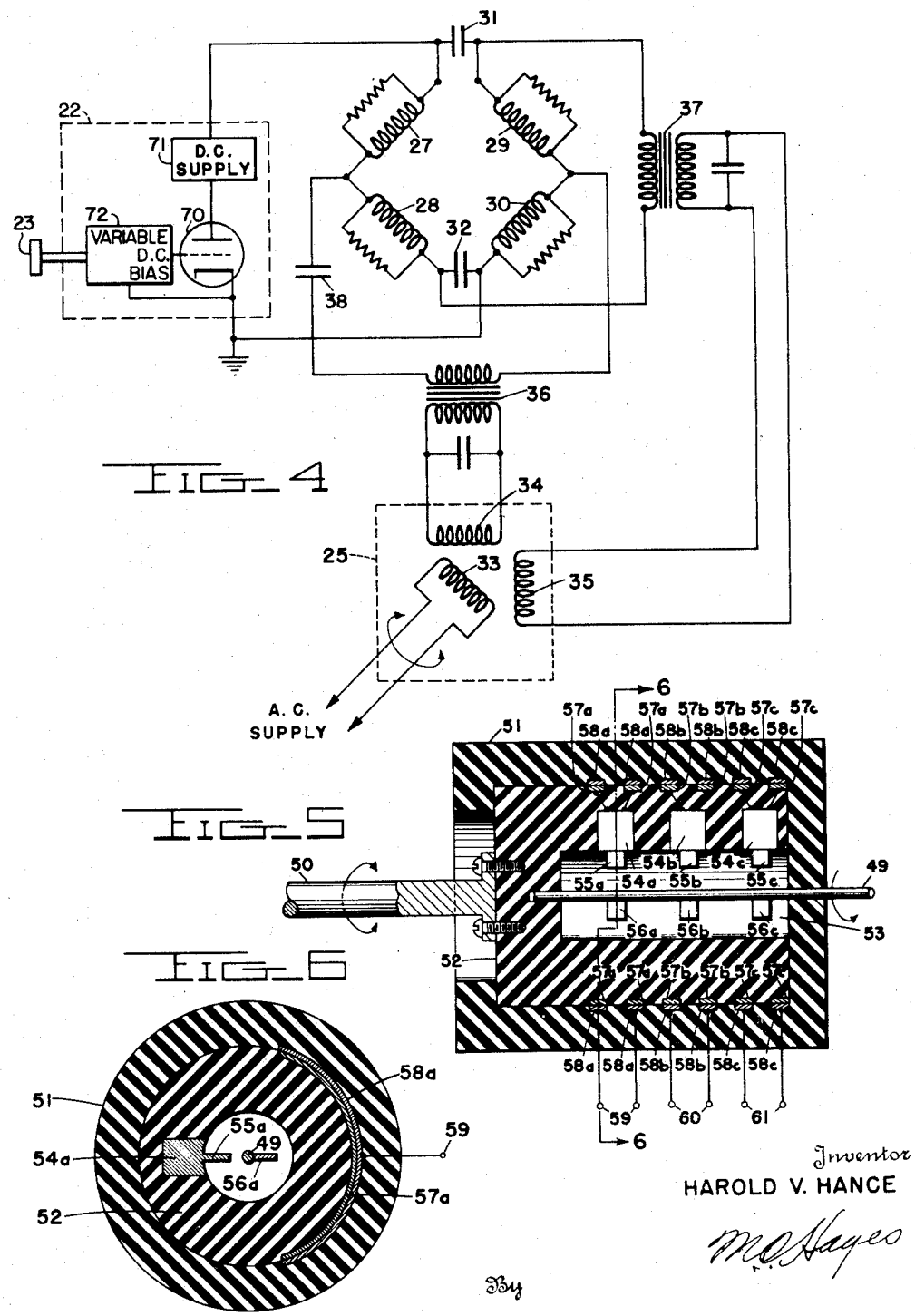

2,950,475
Patented Aug. 23, 1960

---

2,950,475

OFF-CENTER CURSOR FOR PPI

Harold V. Hance, 22 Spencer St., Lexington 73, Mass.

Filed Nov. 14, 1947, Ser. No. 786,037

10 Claims. (Cl. 343—10)

(Granted under Title 35, U.S. Code (1952), sec. 266)

This invention relates to indicating devices and more particularly to a device for producing a cursor reference line for use with off-center radial-scan radar indicators.

In conventional radial-scan radar systems, that is, radio echo apparatus of the type for producing a plan position indication on a viewing screen of an area extending 360° about the apparatus, means are provided for producing a radial trace on the indicating screen, means for rotating the trace in synchronism with rotation of the directional beam antenna of the apparatus and means for producing remote object indications on the trace whereby range of remote objects is obtained therefrom by the radial distance of the indications from the center of the viewing screen and whereby azimuth of remote objects is derived from the angular displacement of the indications with respect to a reference direction. In order to obtain accurate azimuth information the prior radial-scan radar indicating systems include a rotatable cursor line mounted parallel to the viewing screen and a scale, calibrated in degrees, positioned about the periphery of the screen. In operation, the cursor line is centered on the indication and an accurate azimuth angle thereof is read from the scale at the point thereon intersected by the cursor line.

In other radio echo ranging apparatus for producing a plan position indication, such as the apparatus disclosed in the application of Robert M. Page, Serial No. 459,010, filed September 19, 1942, for Radio Echo Apparatus, now U.S. Patent 2,629,866, means are provided for off-center operation of the plan position indication. See also U.S. Patent 2,610,319. In off-center operation, the point about which the radial trace normally rotates is movable to a position remote from the center of the viewing screen and the trace is expandable to show only a selected portion of the plan position indication upon the entire area of the viewing screen. Off-center operation therefore provides an amplified presentation of a selected portion of an area extending 360° about the apparatus from which more accurate range and azimuth information is obtainable. However, difficulties have been encountered when attempting to obtain accurate azimuth indications during off-center operation. A rotatably mounted cursor line and a cooperating calibrated scale of the character mentioned heretofore cannot be employed during off-center operation since correct azimuth indications could only be obtained therefrom during one condition of off-centering.

It is therefore an object of the present invention to provide novel means for producing azimuth indications of a high degree of accuracy during off-center operation of a radio echo apparatus of the type providing a plan position indication.

Another object is to provide novel means for indicating azimuth of a remote object from a remote object indication on a radial-scan radar indicating screen during off-center operation thereof regardless of the degree and direction of off-center operation.

Still another object is to provide a novel, manually adjustable cursor line on the face of a radial-scan radar indicating screen, with means indicating the angular position of the cursor line relative to a preselected direction.

Still another object is to provide a novel cursor line having the foregoing characteristics operable during off-center operation of a radial-scan radar irrespective of the degree and direction of off-center operation.

Other objects and features of the present invention will appear more fully hereinafter from the following detailed description when considered in connection with the accompanying drawings which disclose one embodiment of the invention. It is to be expressly understood, however, that the drawings are designed for purposes of illustration only and are not to be considered as a definition of the limits of the invention, reference for the latter purpose being had to the appended claims.

In the drawings, wherein similar reference characters denote similar elements throughout the several views:

Fig. 1 is a diagrammatic illustration of a radio echo ranging apparatus including novel cursor line producing means constructed in accordance with the present invention;

Fig. 2 is an illustration of the indication produced by the radio echo ranging apparatus disclosed in Fig. 1;

Fig. 3 is an illustration of the indicating screen of the radio echo ranging apparatus disclosed in Fig. 1 during off-center operation, having a cursor line produced thereon in accordance with the principles of the present invention;

Fig. 4 is a circuit diagram of a portion of the apparatus disclosed in Fig. 1;

Fig. 5 is a diagrammatic showing, in section, of an element of the apparatus disclosed in Fig. 1; and Fig. 6 is a section through the lines 6—6 of Fig. 5.

With reference more particularly to Fig. 1 of the drawings, a radio echo ranging apparatus constructed in accordance with the aforementioned application of Robert M. Page is disclosed therein including a cathode ray indicating device 10 having a viewing face 11 and means, not shown, for generating and directing a beam of electrons toward the center of the viewing face 11. Electromagnetic deflection coils are supported by a cylindrical yoke 12 rotatably mounted about the device 10. The deflection coils are energized with a source of saw-tooth wave forms and suitable direct current bias from generator 13. The energized deflection coils produce an electromagnetic field that radially sweeps the electron beam, from the center of the viewing screen 11, upon each application of a saw-tooth wave form thereto. The radial sweep, or the radial trace as seen on the viewing face 11, is rotated in synchronism with the antenna of the radio echo ranging apparatus, not shown, through pinion 14 and annular gear 15. The video signal output from the receiver channels of the radio echo apparatus, not shown, is applied to intensity control grid 16 of the device 10 to modulate the electron beam thereof. A plan position indication is thereby produced on the viewing face 11 of an area extending 360° about the apparatus. Such plan position indication is disclosed in Fig. 2 of the drawings wherein the viewing face 11 is shown including a radial trace r, rotating in synchronism with the antenna in the direction indicated, and an indications T, T' and T" of remote objects. The intensity of the electron beam is controlled so that only remote object indications are visible on the viewing face 11.

The off-center operating means includes off-center deflection coils carried by cylindrical yoke 17 mounted for rotation about the yoke 12 and manually rotated through annular gear 18, pinion 19, shaft 20 and off-center control knob 21. The off-center deflection coils are supplied with direct current from supply 22, variable upon operation of control knob 23. The energized off-center deflection coils produce a uni-directional electromagnetic field at right angles to the electron beam to off-center the point of rotation of the radial trace r, in a direction determined by the angular position of the yoke 17 and by a degree proportional to the magnitude of the uni-directional magnetic field. The saw-tooth generator 13 includes means for increasing the amplitude of the waveforms upon operation of a control knob 24. During off-center operation, the radial trace may be expanded upon operation of the knob 24. Off-center operation will be more fully understood with reference to Fig. 3 of the drawings wherein the viewing face 11 is shown with the center of rotation of the radial trace r off-centered by an angle A, from a reference N, for example, to a point O' remote from the center O. The trace is shown expanded to traverse the entire diameter of the viewing face 11 from the point O'. With the foregoing arrangement, remote objects included within a preselected portion of the area extending 360° about the apparatus are only indicated on the viewing face 11, in an amplified manner, thereby allowing more accurate range and azimuth information to be obtained therefrom.

As mentioned heretofore, it is an object of the present invention to provide means for producing an adjustable cursor line on a viewing face adapted to be centered on remote object indication of a plan position indication, and means associated with said cursor line producing means to indicate the angular position of the cursor line with respect to a reference direction, with the foregoing means so characterized as to operate in the aforementioned manner during off-center operation of the plan position indication irrespective of the direction or magnitude of the off-center operation. The foregoing means comprises a resolver 25 designed to produce a pair of alternating current outputs that are applied to the off-center deflection coils carried by the yoke 17. Application of the alternating currents to the off-center deflection coils generates an oscillating electromagnetic field that periodically deflects the electron beam to produce a straight line trace on the viewing face 11. As will appear more fully hereinafter, the resolver 25 includes a rotatable member, controlled by a cursor control knob 26, for varying the amplitudes of the alternating current outputs therefrom in a predetermined manner. The arrangement is such that variation of the alternating current amplitudes effects rotation of the oscillating straight line trace about the point of rotation of the radially deflected electron beam.

The foregoing is more readily understood with reference to Fig. 4 wherein the off-center deflection coils and the resolver 25 are shown in circuit form with the interconnecting circuit means therefor. The off-center deflection coils comprise coil sections 27, 28, 29 and 30 symmetrically supported by the yoke 17 about the longitudinal axis of the indicating device 10. The coil sections are provided with suitable iron cores not shown. One end of each of the coil sections 27 and 28, and of each of the coil sections 29 and 30 are connected together, while the other ends of coil sections 27 and 29 and of coil sections 28 and 30 are coupled through capacitances 31 and 32 respectively. The resolver 25 comprises rotor coil 33 and stationary coils 34 and 35 mounted in quadrature and inductively coupled to the rotor 33. The rotor coil 33 is energized from a suitable alternating current supply and is rotated in accordance with rotation of the cursor control knob 26 through means that will be described hereinafter. Alternating currents induced in the stationary coils 34 and 35 are in phase having relative amplitudes varying in quadrature and of values determined by the relative angular position of the rotor coil 33. The output of the stationary coil 34 is applied through impedance matching transformer 36 to the connecting points between coil sections 27, 28 and between coil sections 29, 30, while the output of the stationary coil 35 is applied through impedance matching transformer 37 to the connecting points of coil sections 27 and 29 and of coil sections 28 and 30. The variable direct current supply 22 is applied to the off-center deflection coils by connections to coil sections 27 and 30. Due to the presence of the blocking condensers 31 and 32, and a blocking condenser 38 included in the output of the transformer 36, direct current from the supply 22 is serially applied through coil sections 27, 28, 29 and 30. The variable direct current supply 22 includes vacuum tube 70, direct current supply 71 therefor and variable direct current bias 72 operable upon rotation of the control knob 23. The tube 70 functions to block the flow of alternating current to the supply 22 and provides adequate means for controlling the flow of direct current.

The serial flow of direct current from the supply 22 through the coil sections 27, 28, 29 and 30 produces a resultant uni-directional electromagnetic field within the device 10, in fixed relation with the coil sections, of a magnitude determined by the value of direct current applied. This uni-directional electromagnetic field deflects the electron beam from the longitudinal axis of the device 10 in a direction determined by the angular position of the yoke 17, controlled by the off-center control knob 21, and by a degree in accordance with the strength of the field, determined by the adjustment of the control knob 23. Application of the alternating currents from the resolver 25 to the coil sections 27, 28, 29 and 30, produces a resultant oscillating electromagnetic field that generates an oscillating straight line sweep of the electron beam, seen on the viewing face 11 as a straight line trace, at an angle, with respect to the centered or off-centered position of the electron beam, determined by the angular positions of the yoke 17 and the rotor coil 33. Upon rotation of the rotor coil 33, the resultant oscillating electromagnetic field varies in such a manner that the oscillating straight line trace rotates in synchronism therewith about the centered or off-centered position of the electron beam. In Fig. 3, a straight line trace 39, produced by the apparatus as described above, is shown extending from the off-centered position O' of the electron beam at a certain angle C with respect to the reference direction N.

As mentioned heretofore, means are provided by the present invention for accurately determining and indicating the angular position of the straight line trace of the electron beam, with respect to a reference direction, so that the trace may be employed as a cursor line to obtain accurate azimuth values from remote object indications. The foregoing means comprises, with reference to Fig. 1, a differential gearing mechanism 40, of conventional construction, having a pair of input shafts 41 and 42 and an output shaft 43. Rotation of the off-center control knob 21 is applied to the input shaft 41 through the shaft 20 and a pair of angle spiral gears 44, while rotation of the cursor control knob 26 is applied directly to the input shaft 42. The output shaft 43 is connected through a gear reduction mechanism 45 to an azimuth indicator 46. The input shaft 42 is also connected through a gear reduction mechanism 47 to the rotor coil 33 of the resolver 25. The gear reduction mechanisms 45 and 47, the annular gear 18 and the pinion 19, are constructed in such a manner so that the yoke 17, the rotor coil 33 and the azimuth indicator 46 rotate at the same ratio. When the off-center control knob 21 is rotated, to rotate the yoke 17, such rotation is applied through the differential gear mechanism 40 and the gear reduction mechanism 45 to the azimuth indicator 46 whereon the degree of rotation of the yoke 17 is indicated. Rotation of the cursor control knob 26 applies an input to the differential gear mechanism 40, through the shaft 42, as well as imparting rotation to the rotor coil 33 to vary the angular position of the cursor line 39. The input to the differential gearing 40 from the cursor control knob 26 is also applied to the azimuth indicator 46, through shaft 43 and gear mechanism 45. Therefore the azimuth indicator 46 at all times provides an azimuth indication of the cursor reference line 39.

Means are also provided by the present invention for only generating the cursor reference line 39 during a short interval of each complete rotation of the radially swept electron beam and for preventing generation of the plan position indication during such interval. The foregoing means prevents distortion of the plan position indication while providing generation of a clear cursor line. More particularly, the arrangement is such that the cursor line is generated during an interval when a sector of the plan position indication not utilized for providing range and directional information is produced, irrespective of centered or off-centered operation and independently of the direction and magnitude of such off-centered operation. As shown in Fig. 1, the foregoing means comprises switching mechanism 48 operable in accordance with rotation of the yoke 12, through a connection, including shaft 49, to the antenna rotating mechanism, not shown, and in accordance with the angular position of the cursor line 39, through a connection including a shaft 50 which rotates in synchronism with the azimuth indicator 46. The switching mechanism 48, is shown in greater detail in Fig. 5 including a stationary outer casing 51, constructed of insulating material, having a cylindrical member 52, constructed of insulating material, rotatably mounted therein. The shaft 50 is secured to the member 52 to impart rotation thereto. The rotatable cylindrical member 52 is of U-shaped cross section having a centrally located cylindrical opening 53 therein. The shaft 49 is centrally positioned with respect to the member 52 by suitable bearing surfaces in the end portions of casing 51 and member 52, and is extended into the opening 53 throughout the entire length thereof. A plurality of small toggle switches 54a, 54b, and 54c, each including an actuating member 55a, 55b, and 55c, respectively, are mounted in the member 52, in spaced relation, with the actuating members 55a, 55b and 55c extending in a common plane, into the opening 53. A plurality of switch operating members 56a, 56b, and 56c are secured to the shaft 49 in spaced relation corresponding to the spaced relation of the actuating members 55a, 55b and 55c, with each of the switch operating members 56a, 56b, and 56c extending radially from the shaft 49 in a common plane. The arrangement is such that upon each complete rotation of shaft 49, with respect to the member 52, the switches 54a, 54b, and 54c are simultaneously operated in response to engagement between cooperating actuating members 55a, 55b and 55c and switch operating members 56a, 56b and 56c, respectively. The switches 54a, 54b and 54c, the actuating members 55a, 55b and 55c and the switch operating members 56a, 56b and 56c are constructed in such a manner so that the switches 54a, 54b and 54c are maintained in an operated condition for a small number of degrees of relative rotation between the shaft 49 and the member 52, and are simultaneously allowed to return to the unoperated condition thereof when contact between the actuating members and the switch operating members terminates. As will appear more fully hereinafter, the interval of operation of switches 54a, 54b and 54c is sufficient to generate an adequate cursor line. The circuits of the switches 54a, 54b and 54c include a plurality of spaced pairs of cylindrical conductor members 57a—57a, 57b—57b, and 57c—57c embedded in the outer surface of the member 52, with each pair of conductor members 57a—57a, 57b—57b, and 57c—57c electrically connected to the terminals of switches 54a, 54b and 54c, respectively, and a plurality of pairs of cylindrical conductor members 58a—58a, 58b—58b and 58c—58c embedded in the cylindrical inner surface of the member 51 in spaced longitudinal relationship corresponding to the spaced relationship of members 57a—57a, 57b—57b and 57c—57c. Resilient means, not shown, such as thin, undulated, cylindrical springs, are positioned between conductor members 57a, 57b, 57c, 58a, 58b and 58c and respective supporting surfaces of casing 51 and of member 52, to maintain electrical contact between contacting conductor members as shown. Each of the conductor members 58a—58a, 58b—58b, and 58c—58c are respectively connected to terminals 59, 60, and 61 outside the casing 51. Terminals 59 comprise the input and output terminals of switch 54a; terminals 60 comprise the input and output terminals of switch 54b, and terminals 61 comprise the input and output terminals of switch 54c. As shown in Fig. 1, the switch 54a is included in the connection between the output of the generator 13 and the radial sweep deflection coils carried by the yoke 12; the switch 54b is connected in series between the video signal input and the intensity control grid 16, and the switch 54c controls application of the alternating current supply to the resolver 25. Switches 54a and 54b are normally biased to establish an electrical connection between the input and output terminals thereof and the switch 54c is normally biased to maintain an open circuit. However, during the period switches 54a, 54b and 54c are operated, the connections between the generator 13 and the radial sweep deflection coils and between the video signal input and the intensity control grid 16 are interrupted, and the alternating current supply is applied to the resolver 25.

In operation, the deflection coils carried by the yoke 12 are energized from the generator 13 to produce a radial sweep of the electron beam and the video signals are applied to the intensity control grid 16. The radial sweep rotates in synchronism with the antenna whereby a plan position indication of an area extending 360° about the antenna is produced on the viewing face 11, including, as shown in Fig. 2, a remote object indication T disposed at an angle C from the reference direction N. When a more accurate range and azimuth information is desired from the indication T, the off-center deflection coils carried by the yoke 17 are energized and the off-center control knob 21 is operated to displace the point of rotation of the radial trace to point O' at an angle A from the reference direction N, for example, as shown in Fig. 3. The radial sweep is expanded, upon operation of knob 24, to traverse the entire area of the viewing face 11. The cursor control knob 26 is operated to rotate the cursor line 39 about the point O' to a centered position on the remote object indication T, as shown in Fig. 3. The output of the differential gear mechanism 40, a summation of the inputs from the operation of control knobs 21 and 26, angles A and B of Fig. 3, is applied to the azimuth indicator 46 whereon the angular position C of the cursor line 39 with respect to the reference direction N is indicated. Since the cursor line 39 is centered on the remote object indication T, the azimuth of the remote object corresponding to indication T is obtained directly from the indication appearing on the azimuth indicator 46.

In operation of the switching mechanism 48, the rotatable cylindrical member 52 is synchronized with the azimuth indicator 46 so that engagement between the actuating members 55a, 55b and 55c and the switch operating members 56a, 56b and 56c, occurs during the interval of effective generation of a sector of the plan position indication disposed substantially 180° from the utilized portion thereof. Therefore, the radial deflection coils and the intensity control grid 16 are not energized during the interval of generation of the cursor line and the cursor line 39 is only generated during a short, unused interval of the plan position indication. Since the angular position of the switches 54a, 54b and 54c are continually varied in accordance with the output of the differential amplifier 40, the cursor line 39 is always generated during an interval of each complete rotation of the antenna wherein an unused indication would ordinarily be produced, and wherein the radial sweep deflection coils and the intensity control grid 16 are not energized, irrespective of the direction and degree of off-center operation.

There is thus provided by the present invention an indicating device for producing a cursor reference line for use with off-center radial-scan radar indicators. The device is so characterized that extremely accurate azimuth indication of remote object are readily obtained by centering the cursor line on the remote object indication, upon operation of a cursor control knob, and reading the azimuth value thereof from a calibrated azimuth indicator. The device is further characterized so that accurate azimuth values of remote objects may be obtained in the foregoing manner, without additional operation and without special adjustments, during off-center operation of the radial-scan indicator, irrespective of the direction and degree of off-center operation. Moreover, the device disclosed herein includes means for automatically generating the cursor line only during an interval equivalent to a small unused section of the plan position indication, while preventing generation of the plan position indication during such interval, irrespective of the direction and magnitude of off-center operation. The last-named means provides a clear cursor line and prevents distortion of the plan position indication.

Although one embodiment of the invention has been disclosed and described herein it is to be expressly understood that various changes and substitutions may be made therein without departing from the spirit of the invention as well understood by those skilled in the art. Reference, therefore, will be had to the appended claims for a definition of the limits of the invention.

The invention described herein may be manufactured and used by or for the Government of the United States of America for governmental purposes without the payment of any royalties thereon or therefor.

What is claimed is:

1. In combination with a cathode ray device having a rotating radial sweep of its electron beam, rotatable deflection means, means energizing said deflection means to displace the center of the sweep of said cathode ray in a direction determined by the angular position of said deflection means, means operable to periodically radially deflect said displaced cathode ray to produce a marker trace on the face of said device, means varying the angular displacement of said radially deflected cathode ray and means responsive to the angular position of said deflection means and said angular displacement to indicate the angular position of said radially deflected cathode ray with respect to a reference direction.

2. In a cathode ray indicator, rotatable cathode ray deflection means, means applying direct current to said deflection means to deflect said cathode ray in a direction determined by the angular position of said deflection means, means including a rotatable member for applying a pair of alternating currents in quadrature to said deflection means to radially deflect the cathode ray at an angle with respect to said direction and means responsive to the angular position of said rotatable deflection means and said rotatable member to indicate the angular position of said radially deflected cathode ray.

3. In a radio echo apparatus, a cathode ray device having means producing an electron beam and a viewing screen, a source of variable direct current, rotatable deflection means responsive to said direct current to deflect said beam in a direction determined by the angular displacement of said rotatable deflection means and by a degree determined by the value of said direct current, means including a rotatable member responsive to a source of alternating current to produce a pair of alternating currents having relative amplitudes determined by the angular displacement of said rotatable member, means applying the output of the last-named means to said rotatable deflection means to produce a radial trace of the electron beam on said screen at an angle determined by the angular position of said rotatable member and means responsive to the angular displacement of said rotatable deflection means and to the angular displacement of said rotatable member for producing an indication of the angular position of said trace irrespective of the direction and degree of electron beam displacement.

4. In a radio echo apparatus having a viewing screen, means generating a plan position indication on said viewing screen, beam deflection means for displacing the center of said plan position indication from said screen in a predetermined direction to indicate only a portion of said plan position indication, means blocking generation of a portion of said plan position indication disposed substantially 180° from said indicated portion, beam sweeping means coupled to said beam deflection means for generating a reference line on said screen during operation of said blocking means and means indicating azimuth of said line.

5. In a radio echo apparatus having a viewing screen, means generating a plan position indication on said viewing screen, beam deflection means for displacing the center of said plan position indication from said screen in a predetermined direction to indicate only a portion of said plan position indication, means blocking generation of a portion of said plan position indication disposed substantially 180° from said indicated portion, beam sweeping means coupled to said beam deflection means for generating a reference line on said screen during operation of said blocking means, means varying the angular displacement of said line and means responsive to said beam deflection means and the last-named means to indicate azimuth of said line.

6. In a cathode ray tube indicating device, first means for producing a rotating radial sweep of the electron beam of said device, beam deflection means operable independently of the rotating radial sweep to periodically deflect said electron beam of said device to produce a marker trace at least once during each rotation of the radial sweep, means for adjusting the angular position of said marker trace, and means coupled to the last named means for indicating the angular position of said marker trace relative to a reference direction.

7. In a cathode ray tube indicating device, first means for producing a rotating radial sweep of the electron beam of said device, means interrupting the generation of said radial trace at least once during each revolution thereof, beam deflection means operable during said interruption to produce a marker trace on the face of said device, means for adjusting the angular position of said marker trace, and means coupled to the last named means for indicating the angular position of said marker trace relative to a reference direction.

8. In a cathode ray tube indicating device, first means for producing a rotating radial sweep of the electron beam of said device, beam deflection means operable to off-set the center of the sweep of said cathode ray tube device, sweep marker generator means coupled to said beam deflection means operable to periodically deflect the electron beam of said device to produce a marker trace on the face of said device at least once during each rotation of the radial sweep, adjustable control means coupled to said beam sweeping means to adjust the angular position of said marker trace, and means coupled to said beam deflection means and to said control means for indicating the angular position of said marker trace relative to a reference direction.

9. In combination with a cathode ray device having a rotating radial sweep of its electron beam, rotatable deflection means, means energizing said rotatable deflection means to displace the center of the radial sweep of said cathode ray beam in a direction determined by the angular position of said rotatable deflection means, means including a rotatable member periodically energizing said rotatable deflection means to radially deflect said displaced cathode ray to produce a marker trace on the face of said device at an angle determined by the angular displacement of said rotatable member, and means coupled to said rotatable deflection means and said rotatable member to indicate the angular relationship of said marker trace with respect to a reference direction.

10. In combination with a cathode ray device having a rotating radial sweep of its electron beam, rotatable deflection means, means applying a source of direct current to said rotatable deflection means to displace the cathode ray in a direction determined by the angular position of said rotatable deflection means, means including a rotatable member for applying alternating current to said rotatable deflection means to radially deflect said displaced cathode ray to produce a marker trace on the face of said device at an angle relative to the angular position of said rotatable deflection means determined by the angular position of said rotatable member, and means coupled to said rotatable deflection means and to said rotatable member to indicate angular displacement of said marker trace with respect to a reference direction.

References Cited in the file of this patent

UNITED STATES PATENTS

| | | |
|---|---|---|
| 2,405,231 | Newhouse | Aug. 6, 1946 |
| 2,406,858 | Shepherd | Sept. 3, 1946 |
| 2,440,250 | Deloraine | Apr. 27, 1948 |
| 2,463,529 | Ferrill | Mar. 8, 1949 |
| 2,572,975 | Berger | Oct. 30, 1951 |
| 2,573,017 | Hawarth | Oct. 30, 1951 |
| 2,585,868 | Spaulding | Feb. 12, 1952 |
| 2,589,249 | Hardy | Mar. 18, 1952 |